US010924045B2

(12) United States Patent
Katsurada et al.

(10) Patent No.: US 10,924,045 B2
(45) Date of Patent: Feb. 16, 2021

(54) POWER GENERATION CONTROL SYSTEM, POWER GENERATION CONTROL DEVICE, AND EXTERNAL CONTROL DEVICE

(71) Applicant: Mitsubishi Electric Corporation, Tokyo (JP)

(72) Inventors: Keisuke Katsurada, Tokyo (JP); Junya Sasaki, Tokyo (JP); Masahiro Nakajima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/342,007

(22) PCT Filed: Nov. 2, 2016

(86) PCT No.: PCT/JP2016/082589
§ 371 (c)(1),
(2) Date: Apr. 15, 2019

(87) PCT Pub. No.: WO2018/083755
PCT Pub. Date: May 11, 2018

(65) Prior Publication Data
US 2019/0253011 A1 Aug. 15, 2019

(51) Int. Cl.
*H02P 9/14* (2006.01)
*H02J 7/14* (2006.01)
*H02P 9/02* (2006.01)

(52) U.S. Cl.
CPC ............. *H02P 9/14* (2013.01); *H02J 7/1423* (2013.01); *H02P 9/02* (2013.01); *H02J 7/143* (2020.01)

(58) Field of Classification Search
CPC ............... H02P 9/14; H02P 9/02; H02J 7/143
See application file for complete search history.

(56) References Cited

U.S. PATENT DOCUMENTS

2005/0135133 A1* 6/2005 Maehara ................. H02J 7/243
363/144
2006/0208709 A1* 9/2006 Labitzke .................. H02J 1/10
322/28

(Continued)

FOREIGN PATENT DOCUMENTS

JP 2009-213222 A 9/2009
JP 5383919 B2 1/2014

(Continued)

OTHER PUBLICATIONS

International Search Report for PCT/JP2016/082589 dated Jan. 24, 2017 [PCT/ISA/210].

(Continued)

*Primary Examiner* — Sean Gugger
(74) *Attorney, Agent, or Firm* — Sughrue Mion, PLLC; Richard C. Turner

(57) ABSTRACT

Power generation control devices (4) of respective power generators (1) transmit conduction rates of field coils (101) of the respective power generators (1) to an external control device (5), while the external control device (5) obtains an average value of the conduction rates, obtains a field duty limiting command value for limiting the conduction rate of the field coil (101) determined by the power generation control device (4) based on the average value, and transmits the field duty limiting command value to the power generation control device (4). With this operation, the power generation control device (4) limits power generation amounts of the respective power generators (1) based on the command value, to thereby equalize the power generation amounts of the respective power generators (1).

7 Claims, 11 Drawing Sheets

(56) References Cited

U.S. PATENT DOCUMENTS

| | | | | |
|---|---|---|---|---|
| 2007/0046028 A1* | 3/2007 | Gizara | ...................... | H02P 9/04 |
| | | | | 290/54 |
| 2009/0218889 A1* | 9/2009 | Kouwa | ................ | H02J 7/1423 |
| | | | | 307/84 |
| 2016/0049891 A1* | 2/2016 | Frampton | ............... | H02P 9/006 |
| | | | | 322/25 |
| 2017/0317629 A1* | 11/2017 | Sasaki | ...................... | H02P 9/14 |

FOREIGN PATENT DOCUMENTS

| | | |
|---|---|---|
| JP | 2014-230310 A | 12/2014 |
| WO | 2012/029104 A1 | 3/2012 |

OTHER PUBLICATIONS

Communication dated Oct. 30, 2019, from the European Patent Office in counterpart European Application No. 16920583.8.

* cited by examiner

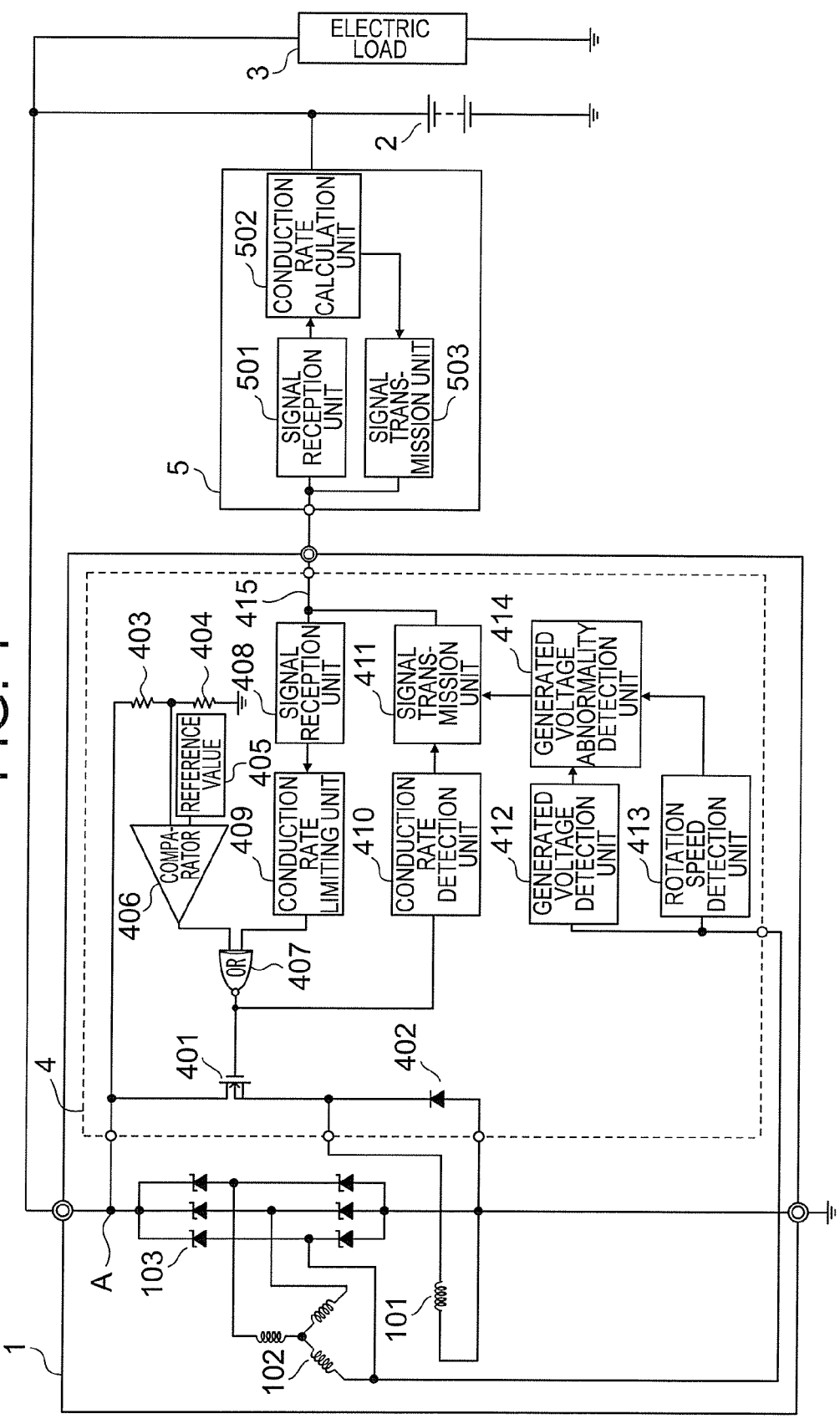

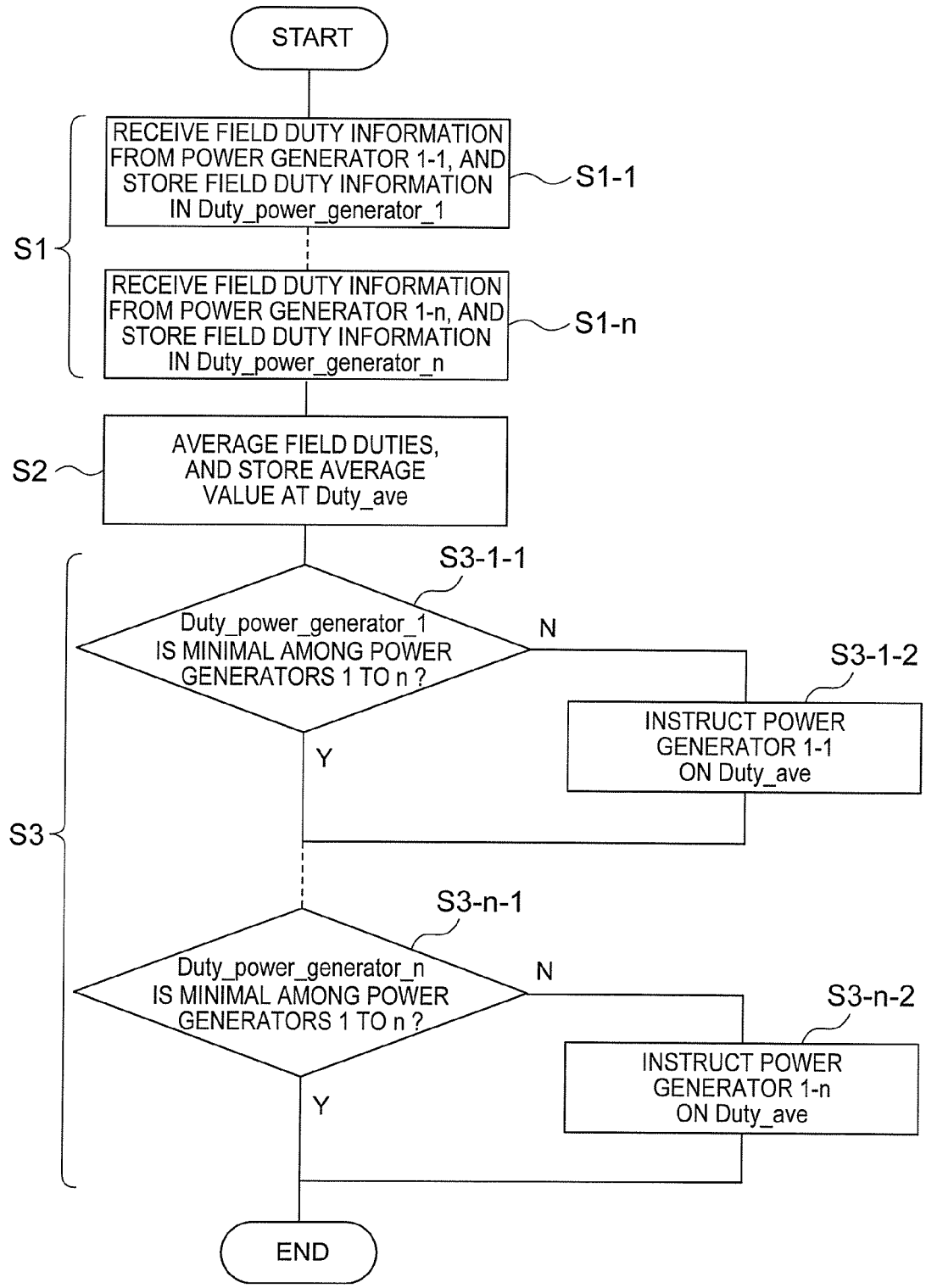

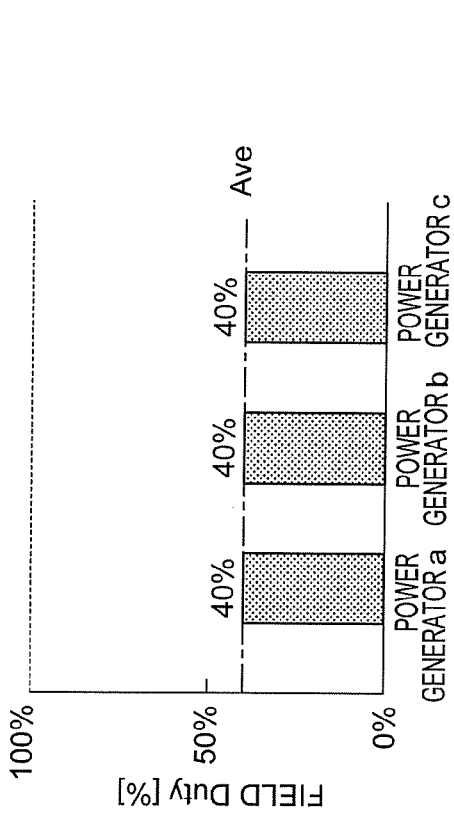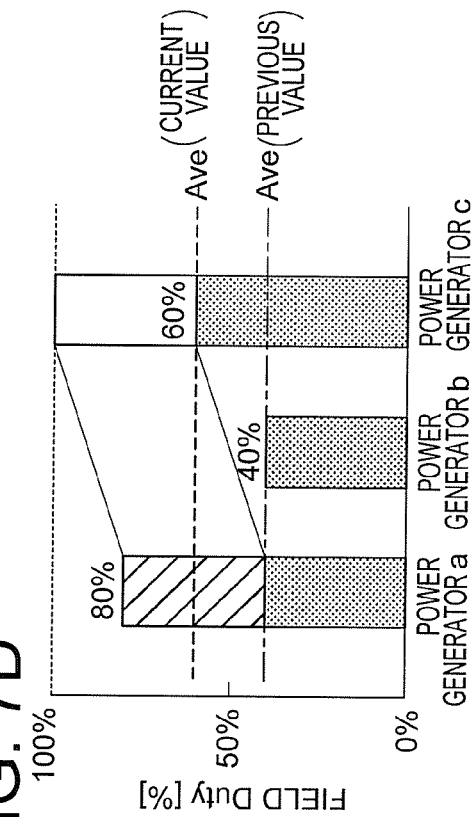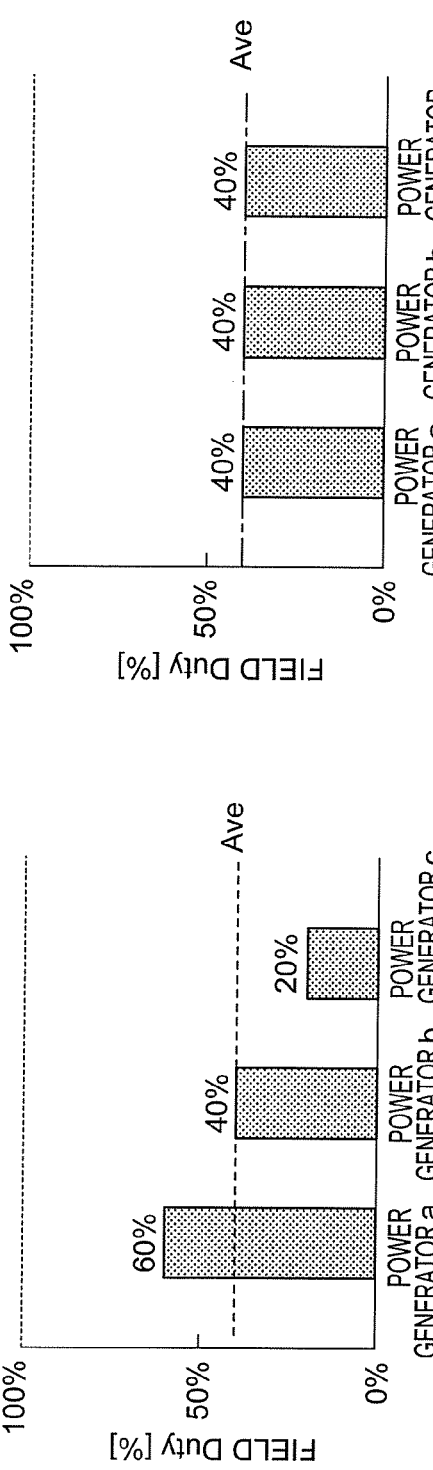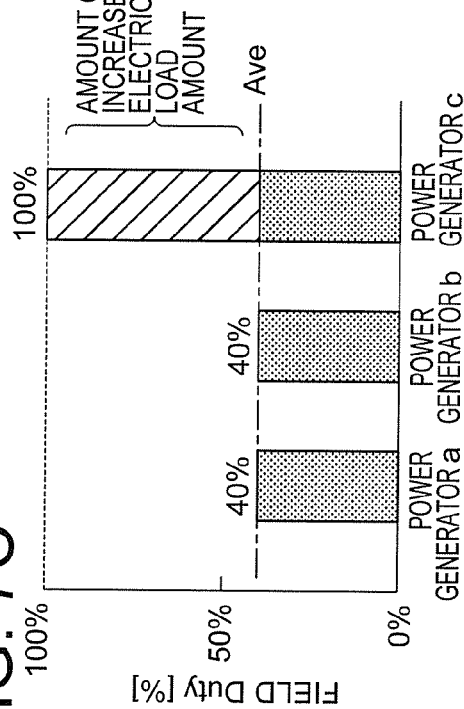

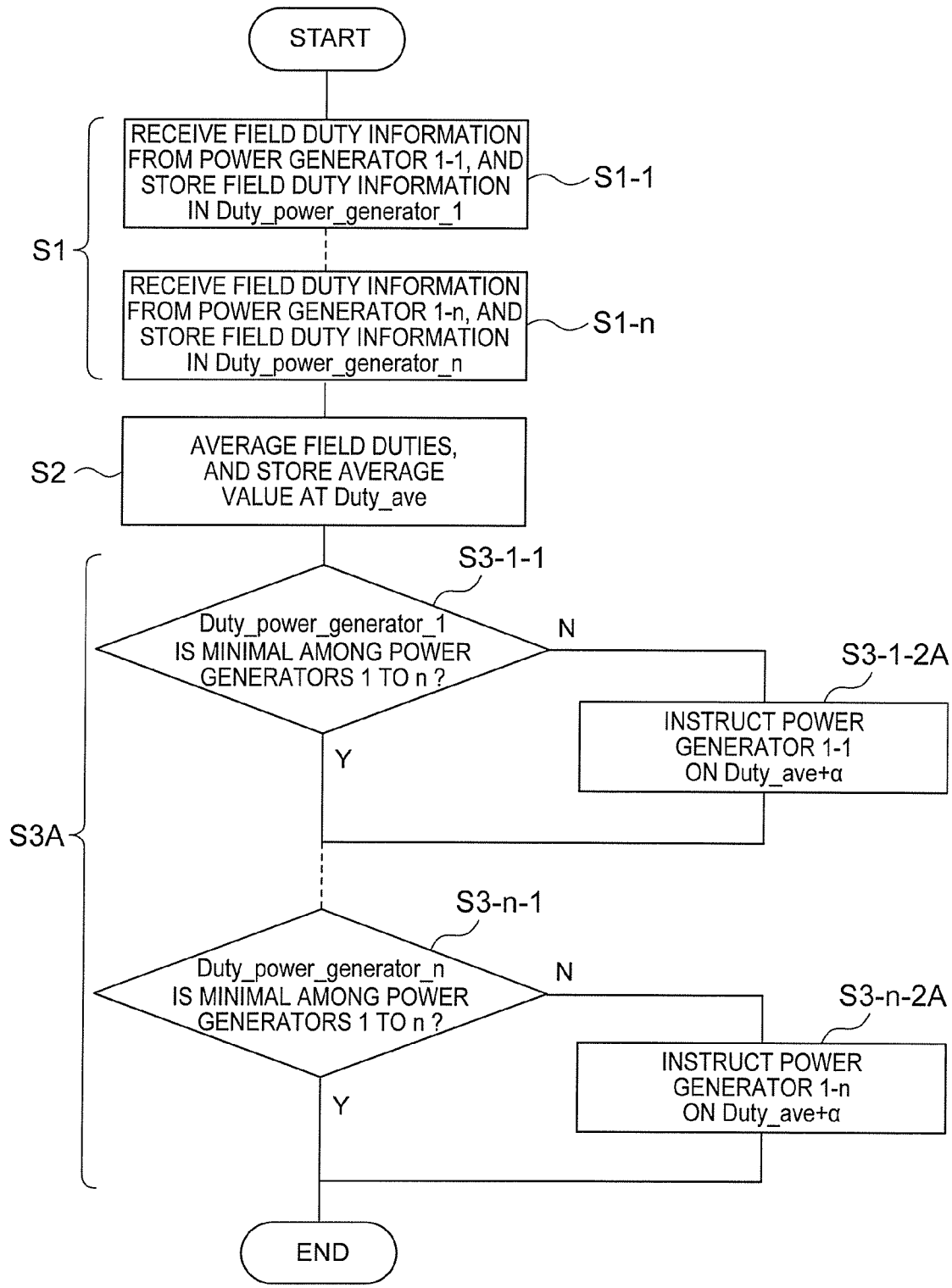

POWER GENERATION CONTROL SYSTEM, POWER GENERATION CONTROL DEVICE, AND EXTERNAL CONTROL DEVICE

CROSS REFERENCE TO RELATED APPLICATIONS

This application is a National Stage of International Application No. PCT/JP2016/082589 filed Nov 2, 2016.

TECHNICAL FIELD

The present invention relates to a power generation control system, a power generation control device, and an external control device, and more particularly, to a power generation control system, a power generation control device, and an external control device, which serve to control an alternator for a vehicle driven by an internal combustion engine.

BACKGROUND ART

In a vehicle system in which a plurality of power generators are mounted to one internal combustion engine, imbalance occurs among power generation amounts of the respective power generators depending on manufacturing variations of each power generator in terms of a power generation control voltage and the state of a charging line, which leads to a problem that a power generator having a steadily higher power generation amount has a shorter life.

Against such a problem, there has been proposed, for example, a power generation control device described in Patent Literature 1. In Patent Literature 1, two power generators are provided to a vehicle system. One of the power generators is set as a "main power generator", while the other one of the power generators is set as a "sub-power generator". A conduction rate of the "sub-power generator" to a field coil is set to have the same value as that of a conduction rate of the "main power generator" to the field coil. This equalizes the power generation amount of the "main power generator" and the power generation amount of the "sub-power generator", which inhibits the power generator from having a shorter life.

CITATION LIST

Patent Literature

[PTL 1] WO 2012/029104 A1

SUMMARY OF INVENTION

Technical Problem

In the case of such a power generation control device as described in Patent Literature 1, both the main power generator and the sub-power generator require dedicated terminals for sharing conduction rate information on the field coil and dedicated wiring for connecting the respective terminals.

Incidentally, in recent years, a power generation control device for a vehicle having a function of performing two-way communication to/from an external control device has been increasing in number. In such a power generation control device, each control parameter of the power generation control device is set or changed from the external control device, and a control state of a power generator is transmitted to the external control device. When the power generation control device described in Patent Literature 1 is applied to such a power generation control device, it is required to provide communication wiring for performing the two-way communication as well as the dedicated terminal and the dedicated wiring for equalizing the power generation amounts of respective power generators, which are described above. This leads to a problem of an increase in vehicle wiring cost, and further leads to a problem that when the dedicated terminal is abnormal, it is impossible to maintain balance among the power generation amounts of the respective generators.

The present invention has been made in order to solve the above-mentioned problem, and has an object to obtain a power generation control system, a power generation control device, and an external control device, which are capable of equalizing power generation amounts among a plurality of power generators without requiring a dedicated terminal and a dedicated wiring.

Solution to Problem

According to one embodiment of the present invention, there is provided a power generation control system, which is configured to simultaneously drive a plurality of power generators mounted to one internal combustion engine by the internal combustion engine, the power generation control system including: a power generation control device configured to control each of the plurality of power generators; and an external control device connected to the power generation control device, wherein the power generation control device includes: a field driver configured to control supplying of a field current to a field coil provided to each of the plurality of power generators; a voltage control unit configured to determine a conduction rate of the field coil based on an output voltage of each of the plurality of power generators to control the field driver, to thereby adjust the generated voltage of each of the plurality of power generators at a target voltage value; a conduction rate detection unit configured to detect the conduction rate of the field coil of each of the plurality of power generators; a first signal transmission unit configured to transmit the conduction rate detected by the conduction rate detection unit to the external control device; a first signal reception unit configured to receive a command value for limiting the conduction rate of the voltage control unit from the external control device; and a conduction rate limiting unit configured to impose a limit on the conduction rate so as to set the conduction rate determined by the voltage control unit to become equal to or smaller than the command value based on the command value received by the first signal reception unit, wherein the external control device includes: a second signal reception unit configured to receive the conduction rates of the field coils of the respective plurality of power generators, each of which has been detected by the conduction rate detection unit, from the power generation control device; a conduction rate calculation unit configured to obtain an average value of the conduction rates of the field coils of the respective plurality of power generators, which have been received by the second signal reception unit, to set the command value based on the average value; and a second signal transmission unit configured to transmit the command value set by the conduction rate calculation unit to the power generation control device, and wherein the conduction rate calculation unit of the external control device is configured to set a power generator having the minimum conduction rate as a power generator excluded from a limiting target based on the conduction rates of the field coils of the respective plurality of power generators, which have been received by the second signal reception unit, set a power generator other than the power generator excluded from the limiting target as a power generator of the limiting target, and transmit the command value to only the power generation control device connected to the power generator of the limiting target via the second signal transmission unit.

Advantageous Effects of Invention

With the power generation control system according to one embodiment of the present invention, the power generation control devices of the respective power generators transmit the conduction rates of the field coils of the respective power generators to the external control device, while the external control device obtains the average value of the conduction rates of the field coils of the respective power generators, obtains a command value for limiting the conduction rate of the field coil determined through feedback control by the power generation control device based on the average value, and transmits the command value to the power generation control device. Accordingly, it is possible to prevent the power generation amounts of the plurality of power generators from becoming imbalanced without particularly requiring a dedicated terminal, a dedicated wiring, or other such parts, to thereby be able to equalize the power generation amounts of the plurality of power generators.

BRIEF DESCRIPTION OF DRAWINGS

FIG. 1 is a configuration diagram for illustrating a configuration of a power generation control system for a vehicle according to a first embodiment of the present invention.

FIG. 2 is a flow chart for illustrating an operation of an external control device provided to the power generation control system for the vehicle according to the first embodiment of the present invention.

FIGS. 7A, 7B, 7C and 7D are graphs for showing an exceptional transition of the power generation amount of each power generator controlled by the power generation control system for the vehicle according to the first embodiment of the present invention.

FIG. 8 is a flowchart for illustrating a modification example of the operation of the external control device provided to the power generation control system for the vehicle according to the first embodiment of the present invention.

DESCRIPTION OF EMBODIMENTS

First Embodiment

Figure 3A:
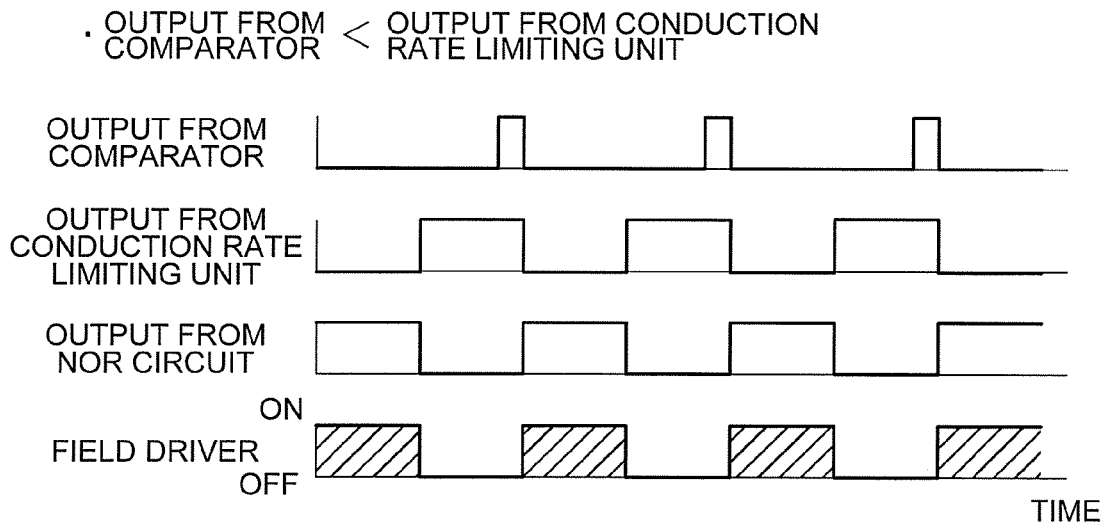
FIG. 3A is a timing chart for illustrating a PWM signal state of a field driver of a power generation control device provided to the vehicle power generation control system according to the first embodiment of the present invention.

Now, a power generation control system for a vehicle (hereinafter referred to simply as "power generation control system") according to a first embodiment of the present invention is described with reference to the accompanying drawings.

The power generation control system according to this embodiment is a power generation control system for simultaneously driving a plurality of power generators for the vehicle (hereinafter referred to simply as "power generators"), which are mounted to one internal combustion engine, in parallel by the internal combustion engine.

FIG. 1 is a configuration diagram for illustrating a configuration of the power generation control system according to this embodiment. As illustrated in FIG. 1, the power generation control system includes a power generation control device 4 configured to control a power generator 1 and an external control device 5 connected to the power generation control device 4. The power generation control device 4 and the external control device 5 perform two-way communication to/from each other. In FIG. 1, a case in which the power generation control device 4 is mounted in the inside of the power generator 1 is illustrated, but this embodiment is not limited to this case, and the power generation control device 4 may be provided to the outside of the power generator 1.

In FIG. 1, only one power generator is illustrated as the power generator 1 for the sake of simplicity of the drawing, but in an actual case, a plurality of power generators are mounted. In the following description, it is assumed that "n" power generators 1 are provided, where "n" represents a positive integer. When being distinguished from one another, those power generators 1 are referred to as "power generator 1-1", "power generator 1-2", . . . , and "power generator 1-n". All those "n" power generators basically have the same configuration and perform the same operation. Therefore, in the following description, the power generator 1-1 is mainly described as the power generator 1, and descriptions of the other power generators are omitted.

The power generator 1 is connected to the internal combustion engine (not shown) mounted to the vehicle via a belt, and obtains a drive force from the internal combustion engine, to thereby generate electric power. The power generation control device 4 of the power generator 1 performs field current control for intermittently supplying a field current to a field coil 101 provided to each of the power generators 1, to thereby adjust the generated voltage of the power generator 1 at a target voltage value.

The power generator 1 includes the field coil 101 configured to generate a magnetic flux required for power generation, a stator coil 102 configured to generate an AC electromotive force by the magnetic flux to output AC power, and a rectifier 103 configured to perform full-wave rectification in order to convert an AC output current that has occurred in the stator coil 102 into a direct current.

An output terminal A of the rectifier 103, namely, the output terminal A of the power generator 1, is connected to a positive terminal of a vehicle storage battery 2, a vehicle electric load 3, and the power generation control device 4. In addition, the field coil 101 is connected to the power generation control device 4. In this manner, a DC output current output from the power generator 1 under the field current control of the power generation control device 4 is supplied to the vehicle storage battery 2 and the vehicle electric load 3. The vehicle electric load 3 represents each of various electric devices mounted to the vehicle and to be operated by electricity.

The power generation control device 4 functions as a controller mainly configured to limit an output voltage and an output current of the power generator 1 to constant levels.

The power generation control device 4 includes a field driver 401 configured to control the field current for supplying power to the field coil 101 and a reflux diode 402 configured to return the field current when the field driver 401 is in an off state.

The power generation control device 4 also includes a comparator 406. The comparator 406 sets a value obtained by dividing an output terminal voltage at the output terminal A of the power generator 1 by resistors 403 and 404 as an input value. The comparator 406 compares a reference value 405, which matches the target voltage value set in advance, with the input value.

When the input value is lower than the reference value 405, the comparator 406 outputs a Low potential. An output from the comparator 406 is input to one input terminal of an NOR circuit 407. An output from a conduction rate limiting unit 409 is input to the other input terminal of the NOR circuit 407. Now, it is assumed that the output from the conduction rate limiting unit 409 is fixed at, for example, the Low potential. At this time, when the Low potential is output from the comparator 406, the NOR circuit 407 outputs a High potential. When an output from the NOR circuit 407 is the High potential, the field driver 401 is brought to an on state. This causes a field current to be supplied to the field coil 101 to increase the output voltage of the power generator 1.

Meanwhile, when the input value is higher than the reference value 405, the comparator 406 outputs the High potential. In this case, assuming that the output from the conduction rate limiting unit 409 is fixed at the Low potential, the NOR circuit 407 outputs the Low potential. When the output from the NOR circuit 407 is the Low potential, the field driver 401 is brought to an off state. This interrupts the field current being supplied to the field coil 101 to reduce the output voltage of the power generator 1.

The power generation control device 4 repeats the above-mentioned operation to perform the PWM control on the field driver 401, to thereby adjust an amount of the field current flowing through the field coil 101 so that the generated voltage of the power generator 1 becomes constant.

In this case, the resistors 403 and 404, the comparator 406, and the reference value 405 form a voltage control unit configured to determine a conduction rate of the field coil 101 based on the output voltage of the power generator 1 to control the field driver 401, to thereby adjust the generated voltage of the power generator 1 at the target voltage value.

The power generation control device 4 also includes a communication unit 415 configured to allow two-way communication to/from the external control device 5. Examples of a two-way communication scheme include local interconnect network (LIN) communication using a communication protocol that enables two-way communication through use of one wire. Therefore, the communication unit 415 is formed of, for example, wiring for the LIN communication.

The power generation control device 4 further includes a signal reception unit 408 and a signal transmission unit 411, which are connected to the communication unit 415. The conduction rate limiting unit 409 is connected to the signal reception unit 408. A conduction rate detection unit 410 is connected to the signal transmission unit 411.

The power generation control device 4 uses the signal reception unit 408 to receive a field duty limiting command value for limiting the conduction rate (hereinafter referred to as "field duty") of a field coil, which has been determined by the voltage control unit, from the external control device 5 via the communication unit 415. The signal reception unit 408 outputs the received field duty limiting command value to the conduction rate limiting unit 409. The conduction rate limiting unit 409 D/A converts the field duty limiting command value, and outputs the PWM signal of the field duty corresponding to the field duty limiting command value to the NOR circuit 407. The NOR circuit 407 calculates the NOR of the output from the comparator 406 and the output from the conduction rate limiting unit 409 to drive the field driver 401 based on the NOR.

In this manner, the conduction rate limiting unit 409 forms a conduction rate limiting unit configured to cooperate with the NOR circuit 407 to impose a limit on the conduction rate so as to set the conduction rate determined by the voltage control unit to become equal to or smaller than the field duty limiting command value based on the field duty limiting command value received from the external control device 5 by the signal reception unit 408.

The power generation control device 4 further causes the conduction rate detection unit 410 to detect its own field duty value based on the output value from the NOR circuit 407. The conduction rate detection unit 410 A/D converts the detected field duty to output the field duty to the signal transmission unit 411. The signal transmission unit 411 transmits the input field duty information to the external control device 5 via the communication unit 415.

In addition, the power generation control device 4 includes a generated voltage detection unit 412, a rotation speed detection unit 413, and a power generation abnormality detection unit 414. The generated voltage detection unit 412 and the rotation speed detection unit 413 are connected to the stator coil 102. An output from the generated voltage detection unit 412 and an output from the rotation speed detection unit 413 are transmitted to the power generation abnormality detection unit 414.

The generated voltage detection unit 412 detects the voltage value of the phase voltage signal of the stator coil 102. The generated voltage detection unit 412 A/D converts the detected voltage value, and transmits the voltage value to the power generation abnormality detection unit 414.

Further, the rotation speed detection unit 413 detects a frequency component of the phase voltage signal of the stator coil 102. The rotation speed detection unit 413 A/D converts the detected frequency component, and transmits the frequency component to the power generation abnormality detection unit 414.

The power generation abnormality detection unit 414 determines whether or not the power generator 1 is in an overvoltage state based on the voltage value of the phase voltage signal received from the generated voltage detection unit 412. When the voltage value of the phase voltage signal is equal to or larger than the threshold voltage set in advance, the power generation abnormality detection unit 414 determines that the power generator 1 is in an overvoltage state.

Further, the power generation abnormality detection unit 414 determines whether or not the power generator 1 is in a non-power generation state based on the voltage value of the phase voltage signal received from the generated voltage detection unit 412 and the frequency component of the phase voltage signal received from the rotation speed detection unit 413. When the frequency of the phase voltage signal is equal to or higher than a power generation start rotation speed of the power generator 1 and the voltage value of the phase voltage signal is lower than the above-mentioned threshold voltage, the power generation abnormality detection unit 414 determines that the power generator 1 is in a non-power generation state.

In the following description, the case in which the power generator 1 is in the overvoltage state and the case in which the power generator 1 is in the non-power generation state are collectively referred to as "power generation abnormal state of the power generator 1".

When detecting the power generation abnormal state of the power generator 1, the power generation abnormality detection unit 414 outputs the power generation abnormality information to the signal transmission unit 411. The power generation abnormality information includes a unique identification information ID of the power generator 1 in order to indicate which one of the power generators 1 has caused an abnormality. The power generation abnormality information also includes classification information for indicating the type of the abnormality. The signal transmission unit 411 transmits the power generation abnormality information to the external control device 5 via the communication unit 415.

As illustrated in FIG. 1, the external control device 5 includes a signal reception unit 501 configured to receive a signal from the power generation control device 4, a conduction rate calculation unit 502 configured to perform calculation regarding the conduction rate of the power generator 1 based on the signal received by the signal reception unit 501, and a signal transmission unit 503 configured to transmit a signal to the power generation control device 4.

The external control device 5 uses the signal reception unit 501 to receive the field duty information and the power generation abnormality information from each of the power generation control devices 4 of the "n" power generators 1. The signal reception unit 501 outputs the received field duty information and the power generation abnormality information to the conduction rate calculation unit 502. The conduction rate calculation unit 502 obtains the average value of the field duties of the respective field coils 101 based on the field duty information on the respective power generators 1 received by the signal reception unit 501, and sets the field duty limiting command value based on the average value. The signal transmission unit 503 transmits the field duty limiting command value to the power generation control device 4.

In a case where the power generation abnormality information is received from the power generation control device 4, the external control device 5 performs the calculation by excluding the conduction rate of the power generator corresponding to the power generation abnormality information when causing the conduction rate calculation unit 502 to calculate the average value of the field duties.

Now, hardware configurations of the power generation control device 4 and the external control device 5 are described.

The signal reception unit and the signal transmission unit of the power generation control device 4 are a reception device and a transmission device, respectively. The respective functions of the power generation control device 4, namely, the field driver 401, the reflux diode 402, the resistors 403 and 404, the reference value 405, the comparator 406, the NOR circuit 407, the signal reception unit 408, the conduction rate limiting unit 409, the conduction rate detection unit 410, the signal transmission unit 411, the generated voltage detection unit 412, the rotation speed detection unit 413, and the power generation abnormality detection unit 414, are implemented by a processing circuit. That is, the power generation control device 4 includes a processing circuit for implementing those functions. The processing circuit may be dedicated hardware, or may be a central processing unit (also referred to as "CPU, processing unit, arithmetic unit, microprocessor, microcomputer, processor, or DSP") configured to execute a program stored in a memory.

When the processing circuit is dedicated hardware, the processing circuit corresponds to, for example, a single circuit, a composite circuit, a programmed processor, a parallel-programmed processor, ASIC, FPGA, or a combination thereof. The function of each of the components of the field driver 401, the reflux diode 402, the resistors 403 and 404, the reference value 405, the comparator 406, the NOR circuit 407, the signal reception unit 408, the conduction rate limiting unit 409, the conduction rate detection unit 410, the signal transmission unit 411, the generated voltage detection unit 412, the rotation speed detection unit 413, and the power generation abnormality detection unit 414 may be implemented by a processing circuit, or the functions of the respective components may be implemented collectively by a processing circuit.

When the processing circuit is a CPU, the functions of the respective components described above are implemented by software, firmware, or a combination of software and firmware. The software and the firmware are written as programs, and stored in a memory. The processing circuit reads and executes the program stored in the memory, to thereby implement the function of each component. That is, when a power generation control device includes a memory for storing programs including respective steps for implementing respective components to be executed resultantly when being executed by the processing circuit. It is also understood that those programs cause the computer to execute procedures and methods for the respective components. In this case, the memory corresponds to, for example, a RAM, a ROM, a flash memory, an EPROM, an EEPROM, or other such non-volatility or volatile semiconductor memory, a magnetic disk, a flexible disk, an optical disc, a compact disc, a MiniDisk, or a DVD.

Some parts of the respective functions of the respective components described above may be implemented by dedicated hardware, and other parts may be implemented by software or firmware. For example, the functions of the conduction rate detection unit 410, the generated voltage detection unit 412, and the rotation speed detection unit 413 can be implemented by a processing circuit serving as the dedicated hardware, or can be implemented by the processing circuit reading and executing the programs stored in the memory. In addition, the generated voltage detection unit 412 may be formed of a voltage sensor, or may be formed of a combination of the voltage sensor and software. In the same manner, the rotation speed detection unit 413 may be formed of a resolver or other such rotation sensor, or may be formed of a combination of the rotation sensor and software.

In this manner, the processing circuit can implement the respective functions described above by hardware, software, firmware, or a combination thereof.

In the external control device 5, in the same manner as in the power generation control device 4, the signal reception unit 501 is a reception device, and the signal transmission unit 503 is a transmission device. The function of the conduction rate calculation unit 502 of the external control device 5 is implemented by a processing circuit. That is, the external control device 5 includes a processing circuit for implementing the function of the conduction rate calculation unit 502. The processing circuit may be dedicated hardware, or may be a central processing unit (also referred to as "CPU, processing unit, arithmetic unit, microprocessor, microcomputer, processor, or DSP") configured to execute a program stored in a memory. The same device as the power generation control device 4 described above applies to the case in which the processing circuit is dedicated hardware and the case in which the processing circuit is a CPU, and hence descriptions thereof are omitted here. Some parts of the function of the conduction rate calculation unit 502 may be implemented by dedicated hardware, and other parts may be implemented by software or firmware.

Next, the operation is described. FIG. 2 is a flow chart for illustrating a flow of processing performed by the conduction rate calculation unit 502 of the external control device 5.

In Step S1, the conduction rate calculation unit 502 receives the field duty information from each power generation control device 4 of each of the "n" power generators 1, and stores the field duty information in a memory (not shown) provided to the external control device 5. Specifically, as illustrated in Step S1-1, the value of the field duty received from the power generation control device 4 of the power generator 1-1 is stored in the memory at an address "Duty_power_generator_1". In the same manner, the value of the field duty received from the power generation control device 4 of the power generator 1-2 is stored in the memory at an address "Duty_power_generator_2". Such a step is repeatedly performed to store, as illustrated in Step S1-*n*, the value of the field duty received from the power generation control device 4 of the power generator 1-*n* in the memory at an address "Duty_power_generator_n".

Subsequently, in Step S2, the conduction rate calculation unit 502 divides a sum value of the field duties of all the power generators 1, which are stored in the memory, by a total number "n" of the power generator 1 to calculate the average value of the current field duties. The conduction rate calculation unit 502 stores the calculated average value in the memory at an address "Duty_ave".

Subsequently, in Step S3, the conduction rate calculation unit 502 compares the values of the field duties of the respective power generators 1, which are stored in the memory, with each other to determine which one of the power generators 1 has the minimum field duty. The field duty is proportional to a power generation amount of the power generator 1, and hence it can be inferred that the smallest field duty means the smallest power generation amount. Subsequently, the conduction rate calculation unit 502 transmits the field duty limiting command value having the same value as the calculated average value to the power generation control device 4 of the power generator 1 other than the power generator 1 having the smallest field duty via the signal transmission unit 503. Meanwhile, the conduction rate calculation unit 502 avoids transmitting the field duty limiting command value to the power generation control device 4 of the power generator 1 having the smallest field duty, and leaves the power generation control device 4 in an unlimited state.

Step S3 is described more specifically. In Step S3, specifically, as illustrated in Step S3-1-1, it is first determined whether or not "Duty_power_generator_1" of the power generator 1-1 is minimal. As a result of the determination, when "Duty_power_generator_1" of the power generator 1-1 is minimal, the flow advances to the subsequent step to determine whether or not "Duty_power_generator_2" of the power generator 1-2 is minimal. Meanwhile, as a result of the determination, when "Duty_power_generator_1" of the power generator 1-1 is not minimal, as illustrated in Step S3-1-2, the field duty limiting command value is transmitted to the power generation control device 4 of the power generator 1-1 to instruct the power generation control device 4 to perform control for setting the field duty of the power generator 1-1 to "Duty_ave". Such a step is repeatedly performed for each power generator in order, and finally, as illustrated in Step S3-*n*-1, it is determined whether or not "Duty_power_generator_n" of the power generator 1-*n* is minimal. When the result of the determination is positive, the flow of FIG. 2 is brought to an end without any further processing. Meanwhile, when the result of the determination is negative, as illustrated in Step S3-*n*-2, the field duty limiting command value is transmitted to the power generation control device 4 of the power generator 1-*n* to instruct the power generation control device 4 to perform control for setting the field duty of the power generator 1-*n* to "Duty_ave".

Now, a description is given of the reason why the field duty limiting command value is not transmitted to all the power generators 1 in Step S3. It is assumed that the field duty limiting command value is transmitted to all the "n" power generators 1. In this case, when there is an abrupt increase in, for example, a load amount of the vehicle electric load 3, the power generation amount temporarily becomes insufficient. As a result, a voltage drop of the vehicle storage battery 2 is caused, which raises a fear of exerting an influence on the entire vehicle system. In view of the foregoing, in this embodiment, by inhibiting the limit based on the field duty limiting command value from being set for the power generator 1 having the minimum field duty, the power generator 1 having the minimum field duty can handle an increase in the power generation amount even when there is an abrupt increase in the load amount of the vehicle electric load 3, which can avoid the voltage drop of the vehicle storage battery 2.

Next, a description is given of an operation performed when the power generation control device 4 receives the field duty limiting command value from the external control device 5.

Figure 3B:
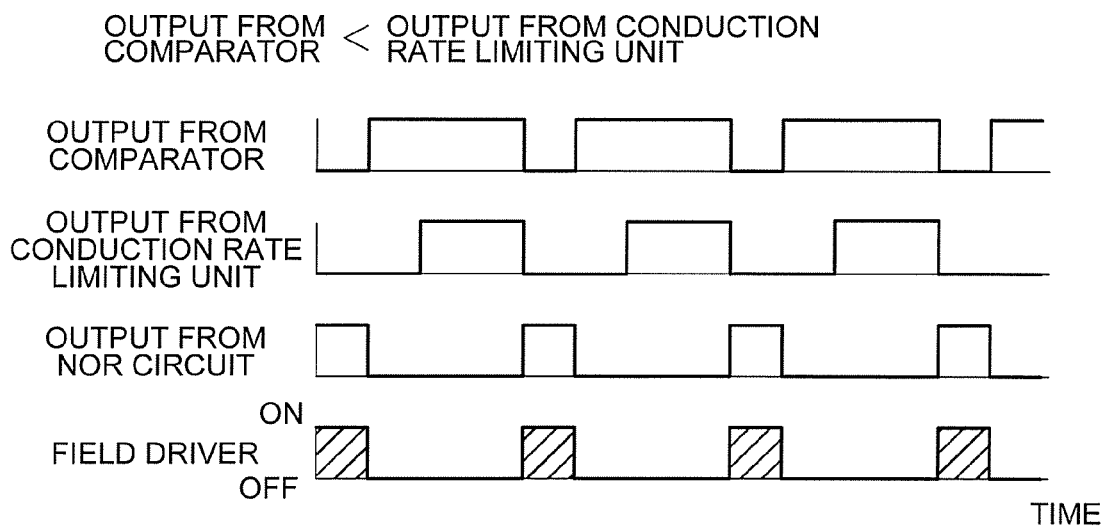
FIG. 3B is a timing chart for illustrating a PWM signal state of the field driver of the power generation control device provided to the vehicle power generation control system according to the first embodiment of the present invention.

In each of FIG. 3A and FIG. 3B, a PWM signal state of the field driver 401 exhibited when the power generation control device 4 of the power generator 1 receives the field duty limiting command value from the external control device 5 is illustrated. In FIG. 3A and FIG. 3B, the potential exhibited when the duty is 100% is fixed to the High potential. FIG. 3A is an illustration of a case in which the field duty of the comparator 406 falls below the field duty limiting command value, and FIG. 3B is an illustration of a case in which the field duty of the comparator 406 is equal to or larger than the field duty limiting command value. In FIG. 3A and FIG. 3B, the horizontal axis represents time, and the vertical axis represents the on/off states of the output from the comparator 406, the output from the conduction rate limiting unit 409, the output from the NOR circuit 407, and the on/off state of the field driver 401.

As described above, the comparator 406 outputs the Low potential when the input value corresponding to the output terminal voltage of the power generator 1 is smaller than the reference value 405 indicating the target voltage value. Meanwhile, the comparator 406 outputs the High potential when the input value corresponding to the output terminal voltage of the power generator 1 is equal to or larger than the reference value 405 indicating the target voltage value. The conduction rate limiting unit 409 outputs a pulse signal corresponding to the field duty limiting command value input from the external control device 5 via the signal reception unit 408. The output from the NOR circuit 407 becomes the High potential when the output from the comparator 406 is the Low potential and the output from the conduction rate limiting unit 409 is the Low potential. When the output from the NOR circuit 407 is the High potential, the field driver 401 is turned on.

As illustrated in FIG. 3A, when the field duty of the comparator 406 falls below the field duty limiting command value, the power generation control device 4 is brought to a state in which the maximum duty of the field driver 401 is limited by the field duty limiting command value from the external control device 5 with respect to the output from the comparator 406.

In contrast, as illustrated in FIG. 3B, when the field duty of the comparator 406 is equal to or larger than the field duty limiting command value, the field duty limiting command value is strictly the limit of the maximum value, and the field duty of the power generator 1 is determined by the output from the comparator 406. Therefore, the generated voltage of the power generator 1 does not exceed the target voltage value, and the stability of a vehicle power source system itself is ensured.

Figure 4:
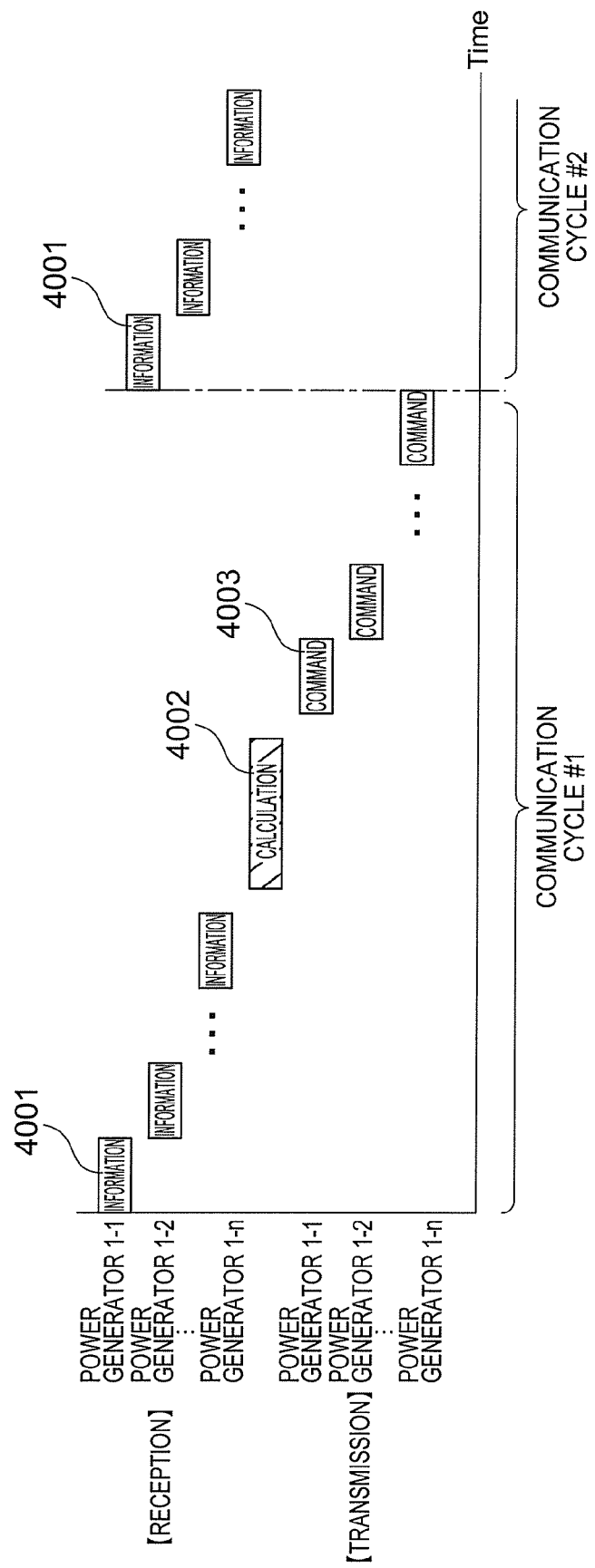
FIG. 4 is a timing chart for illustrating transmission and reception timings of the external control device provided to the power generation control system for the vehicle according to the first embodiment of the present invention.

The conduction rate calculation unit 502 of the external control device 5 performs the storing of the average value in Step S2 of FIG. 2 and the updating of the field duty limiting command value in accordance with a timing of the two-way communication between the power generation control device 4 and the external control device 5. In FIG. 4, a timing chart of the communication is illustrated. As illustrated in FIG. 4, the two-way communication is performed in a communication cycle set in advance. The communication cycle is represented as a communication cycle #1, a communication cycle #2, . . . in FIG. 4.

In FIG. 4, "information" denoted by reference numeral 4001 includes the field duty information and the power generation abnormality information on the power generator 1. In addition, "calculation" denoted by reference numeral 4002 indicates that the conduction rate calculation unit 502 of the external control device 5 performs the calculation illustrated as the flow of FIG. 2. Further, a "command" denoted by reference numeral 4003 indicates the field duty limiting command value transmitted from the external control device 5 to the power generation control device 4. As illustrated in FIG. 4, in each communication cycle, the "information" is first received from the power generation control device 4 of each of the "n" power generators 1 by the external control device 5, then the "calculation" is performed by the external control device 5, and the "command" is transmitted from the external control device 5 to the power generation control device 4. In this manner, in the external control device 5, a timing to receive the signal from the power generation control device 4 of the power generator 1 and a timing to transmit the signal to the power generation control device 4 of the power generator 1 are set in advance, to thereby be able to prevent a collision between the received signal and the transmission signal from occurring in the communication unit 415. In addition, the field duty limiting command value is newly calculated in this communication cycle, and hence this communication cycle serves as the update cycle of the field duty limiting command value.

Figure 5A:
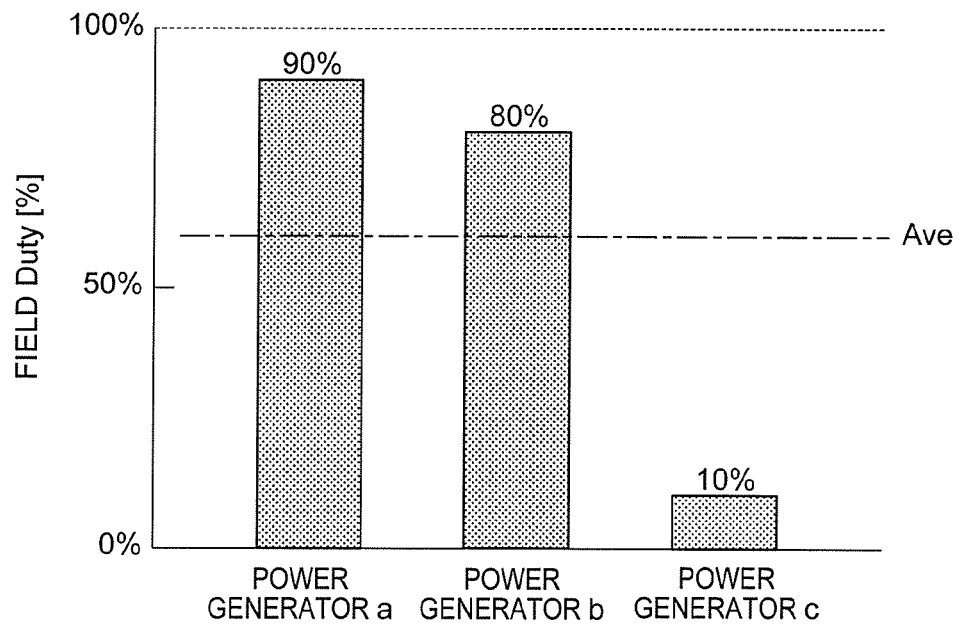
FIGS. 5A and 5B are graphs for showing a transition of a power generation amount of each power generator controlled by the power generation control system for the vehicle according to the first embodiment of the present invention.
Figure 5B:
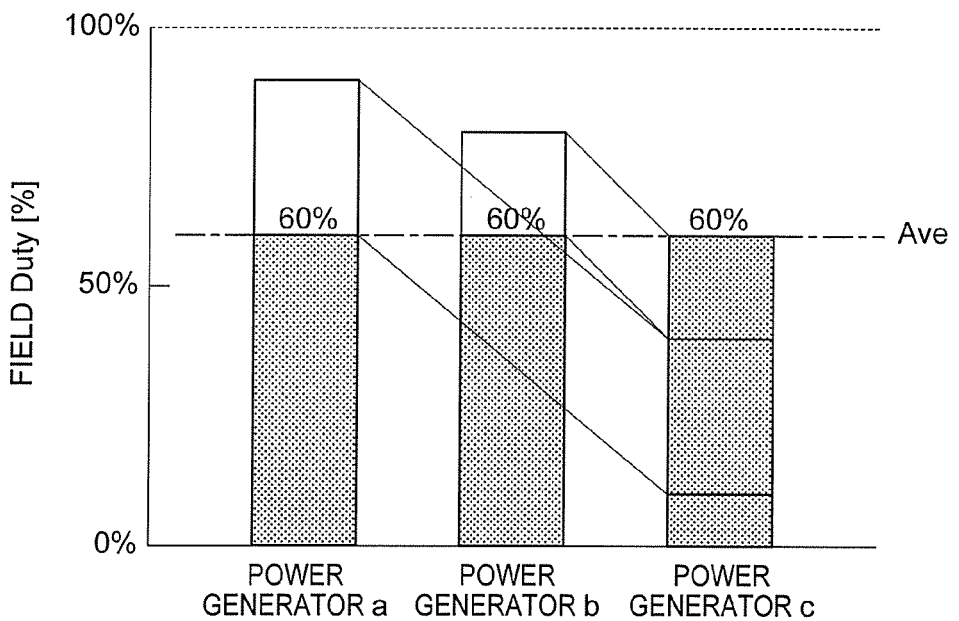

FIGS. 5A and 5B are graphs for showing an example of a transition of the power generation amount of each of the power generators 1 which is exhibited when power generation amount balance control among the power generators 1 is performed based on the field duty limiting command value of the external control device 5. In FIGS. 5A and 5B, the operation performed when three power generators 1 are operated in parallel with one another is shown. In FIGS. 5A and 5B, the three power generators 1 are represented as a power generator "a", a power generator "b", and a power generator "c", respectively.

As shown in FIG. 5A, initial states of the field duties indicating the power generation amounts of the respective power generators "a", "b", and "c" are set to 90% for the power generator "a", 80% for the power generator "b", and 10% for the power generator "c", respectively.

At this time, the total value of the field duties of the respective power generators is 90%+80%+10%=180%, and the average value is 60%. Therefore, the field duty limiting command value is 60%.

The power generator "a" does not have the minimum field duty, and hence the external control device 5 transmits "60%" to the power generator "a" as the field duty limiting command value. The power generator "b" does not have the minimum field duty as well, and hence the external control device 5 transmits "60%" to the power generator "b" as the field duty limiting command value. Meanwhile, the field duty of the power generator "c" has the minimum value, and hence the external control device 5 avoids transmitting the field duty limiting command value to the power generator "c", to thereby bring the power generator "c" to an unlimited state.

Therefore, the power generators "a" and "b" are in a state of being limited by the field duty limiting command value, and hence as shown in FIG. 5B, the field duties of the power generator "a" and the power generator "b" each become 60%.

When a required power generation amount for the vehicle is constant, the power generator "c" is responsible for a surplus power generation amount for which the power generator "a" and the power generator "b" have been responsible. That is, the power generator "c" has such a power generation amount (field duty value) as to be responsible for a total of 50%, that is, 30% being a difference between the initial value and the field duty limiting command value of the power generator "a" and 20% being a difference between the initial value and the field duty limiting command value of the power generator "b". As a result, the field duty of the power generator "c" becomes 60% by having the above-mentioned 50% added to the initial value 10%. In this manner, imbalance among the power generation amounts of the respective power generators "a", "b", and "c" is alleviated.

Figure 6A:
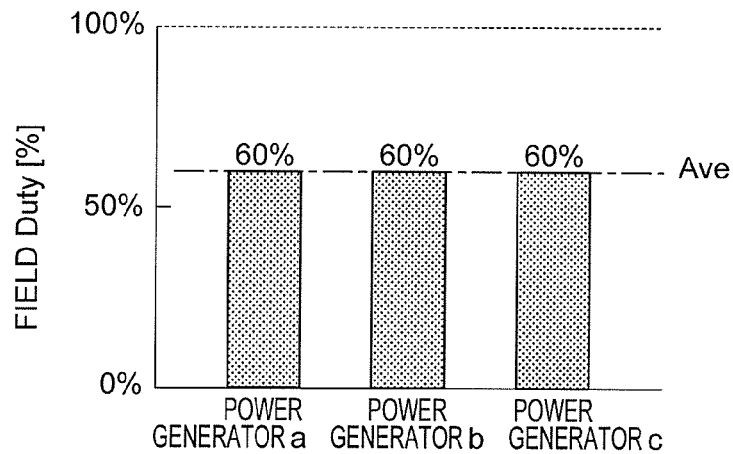
FIGS. 6A, 6B and 6C are graphs for showing a transition of the power generation amount of each power generator controlled by the power generation control system for the vehicle according to the first embodiment of the present invention.
Figure 6B:
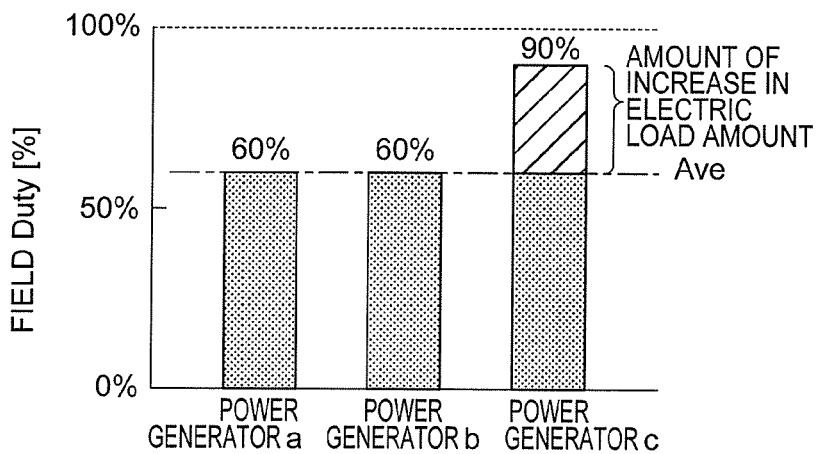
Figure 6C:
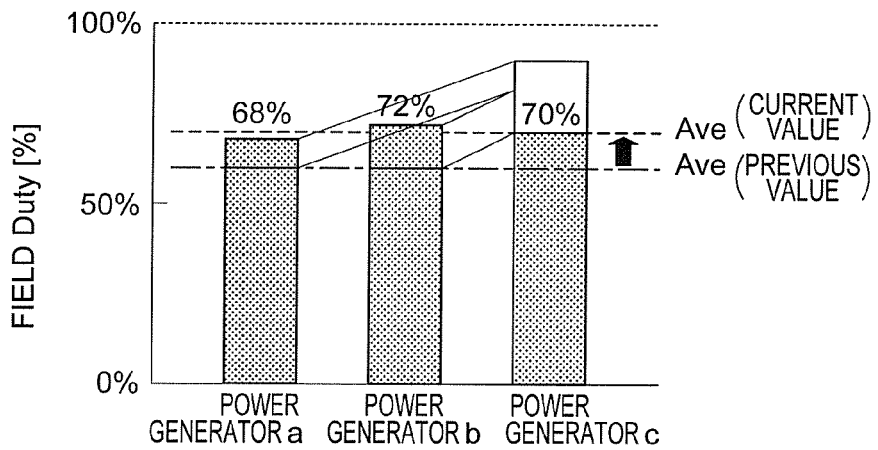

Next, FIGS. 6A-6C are graphs for showing an example of a transition of the power generation amounts which is exhibited when there is an abrupt increase in the load amount of the vehicle electric load 3. In FIGS. 6A-6C, in the same manner as in FIGS. 5A and 5B, the operation performed when three power generators 1 are operated in parallel with one another is shown. In FIGS. 6A-6C, in the same manner as in FIGS. 5A and 5B, three power generators 1 are represented as the power generator "a", the power generator "b", and the power generator "c", respectively.

In FIGS. 6A-6C, as shown in FIG. 6A, the respective power generators "a", "b", and "c" are in an initial state in which the power generator "a" and the power generator "b" have received "60%" as the field duty limiting command value from the external control device 5. Meanwhile, the power generator "c" has the minimum field duty value at the time of the previous average calculation, and is therefore set to the unlimited state in terms of the field duty. Now, as shown in FIG. 5B, the imbalance among the power generation amounts of the respective power generators "a", "b", and "c" has been alleviated, and the field duties of the power generators "a", "b", and "c" are all set equally to 60%.

At this time, consideration is given to a case in which there is an abrupt increase in the load amount of the vehicle electric load 3. The power generators "a" and "b" are having the field duties limited by the field duty limiting command value from an external control device, and hence the field duty cannot be increased even when there is an abrupt increase in the load amount. Meanwhile, the power generator "c" is in the unlimited state, and hence the field duty exhibits an abrupt increase as shown in FIG. 6B.

Only the power generator "c" is responsible for the increase in the power generation amount, and is therefore brought to a temporarily imbalanced state. That is, the states are 60% for the power generator "a", 60% for the power generator "b", and 90% for the power generator "c". However, in the subsequent update cycle, the average value of the field duties is increased to "70%", and hence the field duty of the power generator "c" is no longer minimal. Therefore, the field duty limiting command value of "70%" is transmitted from the external control device 5 to the power generator "c". Meanwhile, the power generator "a" and the power generator "b" have the minimum field duty, and is therefore brought to an unlimited state. As a result, as shown in FIG. 6C, the power generation amounts of the power generator "a" and the power generator "b" increase, and the power generation amount of the power generator "c" decreases, which corrects the imbalance among the power generation amounts of the power generators "a", "b", and "c" as well.

Next, an exceptional example with respect to FIGS. 5A and 5B and FIGS. 6A-6C is shown in FIGS. 7A-7D. In FIGS. 5A and 5B and FIGS. 6A-6C, the example in which the three power generators 1 have the same configuration is shown. Meanwhile, in FIGS. 7A-7D, a case in which the field duty of the power generator "a" is steadily higher than the field duties of the other power generators "b" and "c" is shown.

In FIGS. 7A-7D, as in FIGS. 5A and 5B and FIGS. 6A-6C, the operation performed when the three power generators 1 are operated in parallel with one another is shown. In FIGS. 7A-7D, the three power generators 1 are represented as a power generator "a", a power generator "b", and a power generator "c", respectively.

As shown in FIG. 7A, the initial values of the field duties of the respective power generators "a", "b", and "c" are set to 60% for the power generator "a", 40% for the power generator "b", and 20% for the power generator "c". At this time, the average value of the field duties is 40%, and the field duty limiting command value is "40%" as well.

The power generator "c" has the smallest field duty, and is therefore brought to an unlimited state. Meanwhile, the power generator "a" and the power generator "b" are in a state of having received the field duty limiting command value of "40%" from the external control device 5. As a result, as shown in FIG. 7B, the imbalance among the power generation amounts of the power generators "a", "b", and "c" is corrected as well.

At this time, when there is an abrupt increase in the load amount of the vehicle electric load 3, the power generator "a" and the power generator "b" are in a limited state, and hence as shown in FIG. 7C, the power generator "c" is responsible for the increase in the load amount. In FIG. 7C, the field duty of the power generator "c" increases by 60% to reach 100%.

In the subsequent update cycle, the average value of the field duties of the respective power generators "a", "b", and "c" becomes (40%+40%+100%)÷3=180%÷3=60%. The power generator "a" and the power generator "b" have the minimum field duty, and hence the power generator "c" receives the field duty limiting command value of "60%" from the external control device 5. At this time, the power generator "a" having a steadily high field duty is responsible for a difference of 40% between the previous field duty value of 100% of the power generator "c" and the field duty limiting command value of 60%. As a result, as shown in FIG. 7D, there is a possibility that the field duty of the power generator "a" abruptly increases to 80% after the difference of 40% is added to the current value 40%. Therefore, the field duties of the respective power generators "a", "b", and "c" may be brought to an unstable state of being repeatedly increasing and decreasing.

As a method of suppressing such unstable increase and decrease of the field duties, a flow chart of control in a modification example of this embodiment 1 is illustrated in FIG. 8. A transition of the field duty of each of the power generators in that case is shown in FIGS. 9A-9D. When there are no variations in the power generation amounts of the respective power generators, there is no problem with the processing of the flow of FIG. 2, but when there occur variations among the power generation amounts of the power generator due to, for example, manufacturing variations of each power generator or variations of the state of a charging line, the flow in the modification example illustrated in FIG. 8 may be performed.

FIG. 8 and FIG. 2 are different from each other in that, in FIG. 8, Step S3A is performed in place of Step S3 of FIG. 2. That is, Step S1 and Step S2 of FIG. 8 are the same as Step S1 and Step S2 of FIG. 2, and hence descriptions thereof are omitted here. Step S3A of FIG. 8 is basically the same as Step S3 of FIG. 2, but in FIG. 8, Step S3-1-2A and Step S3-$n$-2A are performed in place of Step S3-1-2 and Step S3-$n$-2 of FIG. 2. In FIG. 2, as illustrated in Step S3-1-2 and Step S3-$n$-2 of FIG. 2, the value of the field duty limiting command value from the external control device 5 is the same value as the average value Duty_ave. However, in FIG. 8, as illustrated in Step S3-1-2A and Step S3-$n$-2A, the value of the field duty limiting command value from the external control device 5 is a value obtained by adding an addition value α set in advance to the average value Duty_ave.

In this manner, in FIG. 8, the external control device 5 receives the field duty information on the respective power generators 1, obtains the average value thereof, and then sets the value obtained by adding the addition value α to the average value as the field duty limiting command value.

Figure 9A:
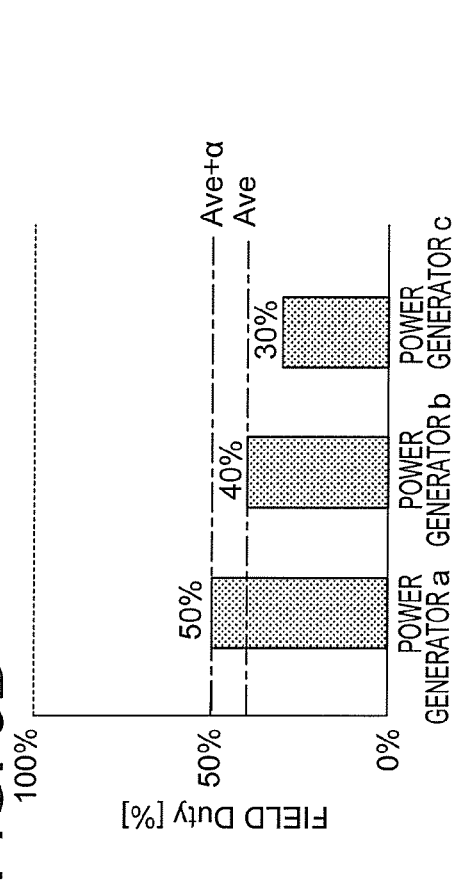
FIGS. 9A, 9B, 9C and 9D are graphs for showing a transition of the power generation amount of each power generator controlled based on the flow chart in FIG. 8 by the power generation control system for the vehicle according to the first embodiment of the present invention.

The operation of the flow of FIG. 8 is described with reference to FIGS. 9A-9D. In the example of FIGS. 9A-9D, as shown in FIG. 9A, in the same manner as in FIGS. 7A-7D, the initial values of the respective power generators "a", "b", and "c" are set to 60% for the power generator "a", 40% for the power generator "b", and 20% for the power generator "c".

The average value of the field duties of the respective power generators "a", "b", and "c" is 40%, and when the addition value α is set to 10%, the field duty limiting command value becomes 40%+10%=50%. The power generator "c" has the minimum field duty, and is therefore brought to an unlimited state. Meanwhile, as shown in FIG. 9B, the power generator "a" and the power generator "b" receive the field duty limiting command value of "50%" from the external control device 5. As a result, the field duty of the power generator "a" decreases by 10% to become 50%, the field duty of the power generator "b" remains 40%, and the field duty of the power generator "c" increases by 10% to become 30%.

Figure 9C:
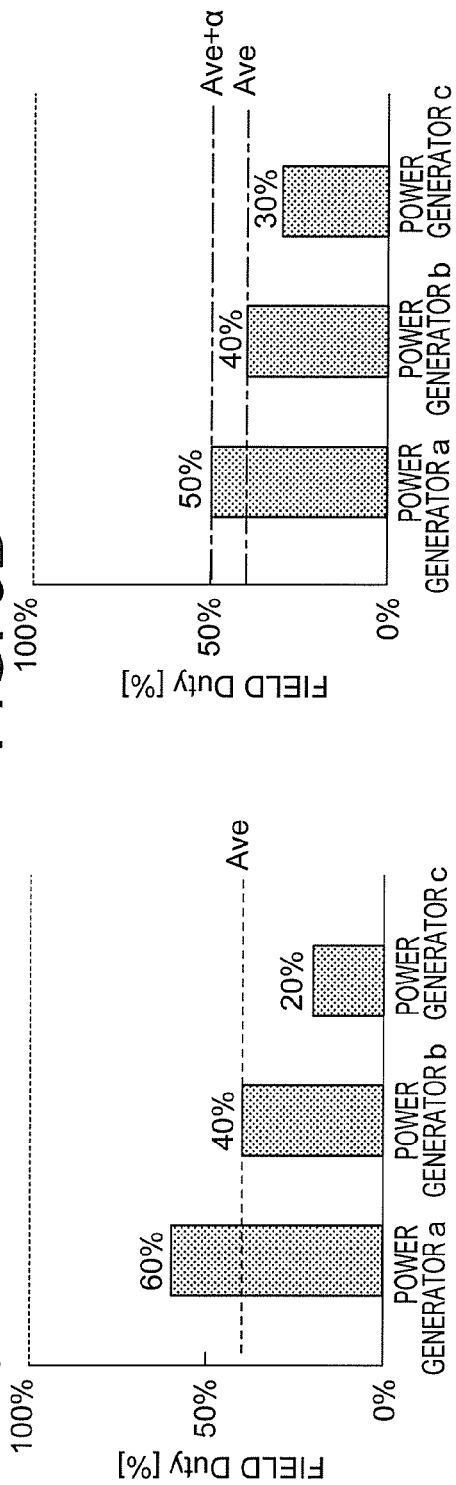
Figure 9B:
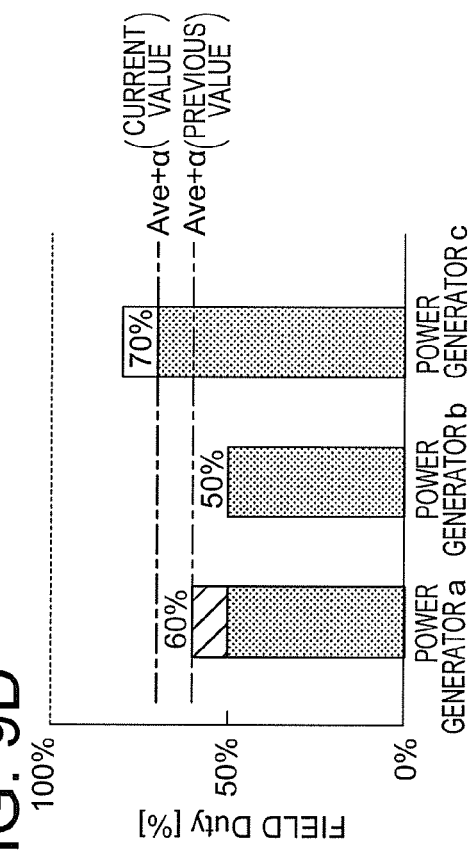
Figure 9D:

At this time, as shown in FIG. 9C, when there is an abrupt increase in the load amount of the vehicle electric load 3 by, for example, the field duty of 60%, the power generator "c" is mainly responsible for the abrupt increase. However, the power generator "b" also has a 10% margin against the field duty limiting command value, which allows the power generator "b" and the power generator "c" to share the abruptly increased load. Specifically, the power generator "b" is responsible for 10%, and the power generator "c" is responsible for 60%−10%=50%. As a result, the field duty of the power generator "c" becomes 30%+50%=80%.

In the subsequent update cycle, the average value of the field duties of the respective power generators "a", "b", and "c" becomes 60%. Therefore, the field duty limiting command value becomes 60%+10%=70% by adding the addition value α of "10%" to the average value. The power generator "b" and the power generator "c" have the minimum field duty, to thereby be brought to an unlimited state. Meanwhile, the power generator "c" receives the field duty limiting command value of "70%" from the external control device 5.

In the power generator "c", as shown in FIG. 9C, the previous field duty value is 80%, and hence the difference from the field duty limiting command value becomes 10%. Therefore, during a transition from FIG. 9C to FIG. 9D, a change amount of the field duty value of the power generator "c" is 10%. Meanwhile, in FIGS. 7A-7D, during a transition from FIG. 7C to FIG. 7D, the change amount of the field duty value of the power generator "c" is 100%−60%=40%. That is, the change amount in FIGS. 9A-9D is smaller than the change amount in FIGS. 7A-7D. Further, even in the power generator "a" having a steadily high field duty, the change amount of the field duty value in FIGS. 9A-9D is smaller than the change amount in FIGS. 7A-7D. That is, during the transition from FIG. 9C to FIG. 9D, the change amount of the field duty value of the power generator "a" is |50%−60%|=10%. Meanwhile, in FIGS. 7A-7D, during the transition from FIG. 7C to FIG. 7D, the field duty value of the power generator "a" is |40%−80%|=40%. In this manner, it is understood that, even in the power generator "a" having a steadily high field duty, the change amount of the field duty value in FIGS. 9A-9D is smaller than the change amount in FIGS. 7A-7D.

In this manner, by applying the flow illustrated in FIG. 8 to this embodiment, as illustrated in FIGS. 9A-9D, it is possible to reduce the abrupt change of the field duty of each power generator even when one power generator among a plurality of power generators has a steadily high field duty. The value of the addition value α is set to 10% in the above description, but is not limited thereto, and may be appropriately determined to a freely-set value. It suffices that the switching from the flow of FIG. 2 to the flow of FIG. 8 is performed merely by switching an operation program for the conduction rate calculation unit 502 of the external control device 5, which facilitates the switching without requiring to change the configurations of the power generation control device 4 and the external control device 5.

Figure 10:
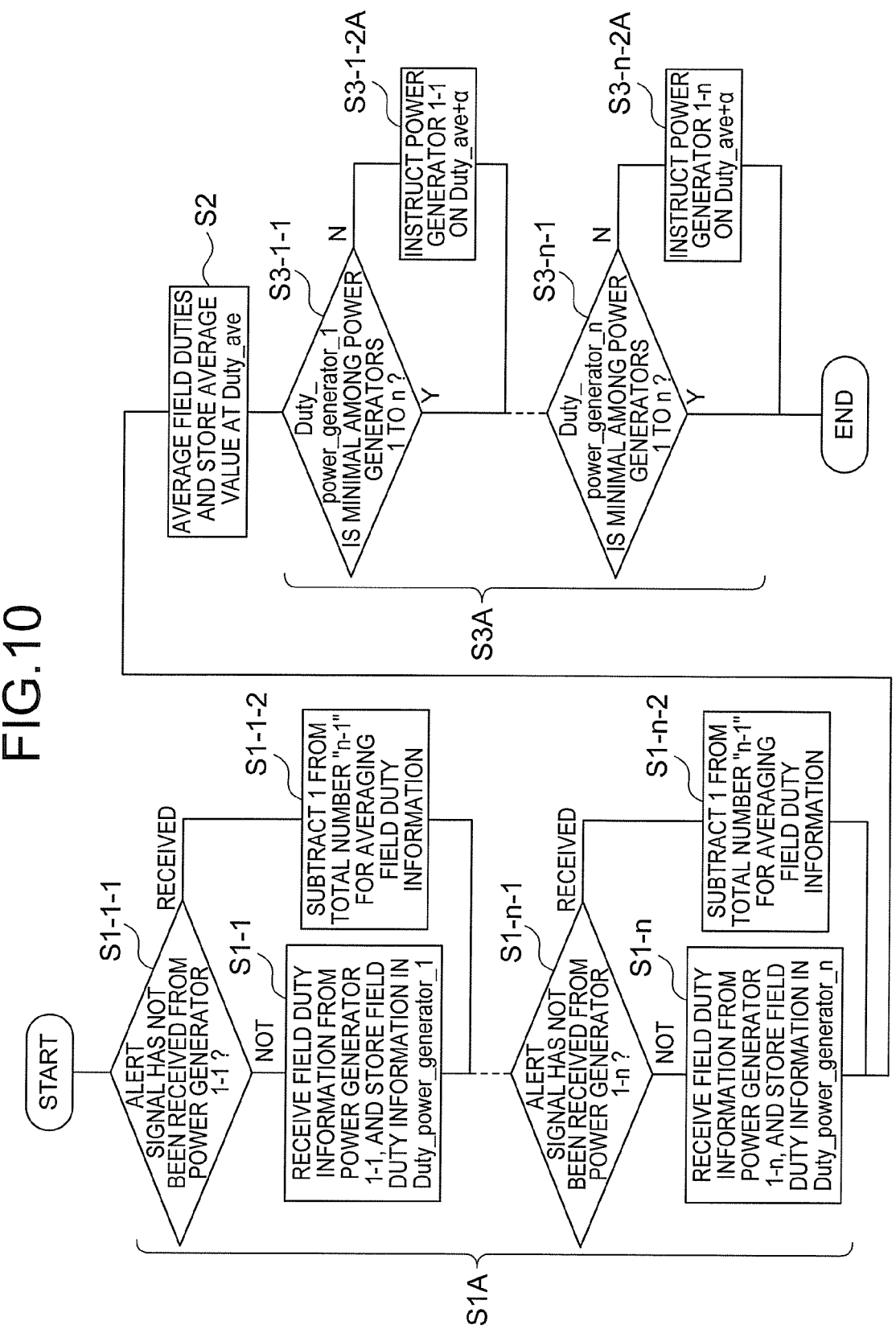
FIG. 10 is a flow chart for illustrating an operation of the external control device provided to the power generation control system for the vehicle according to the first embodiment of the present invention.

Next, in FIG. 10, a flow chart of an operation of the conduction rate calculation unit 502 performed when the external control device 5 receives the power generation abnormality information from the power generation control device 4 is illustrated. FIG. 10 and FIG. 8 are different from each other in that, in FIG. 10, Step S1A is performed in place of Step S1 of FIG. 8. Therefore, Step S2 and Step S3A are the same as those of FIG. 8, and hence descriptions thereof are omitted here.

Step S1A of FIG. 10 is different from Step S1 of FIG. 8 in that Step S1-1-1 and Step S1-1-2 are added to Step S1A of FIG. 10.

In FIG. 10, in Step S1A, the conduction rate calculation unit 502 examines whether or not the power generation abnormality information has been received from any one of the "n" power generators 1. When there is one of the power generators 1 that has transmitted the power generation abnormality information, the conduction rate calculation unit 502 inhibits the field duty value of the power generator 1 from being stored in the memory, and avoids counting the power generator 1-1 in the total number of power generators when the field duty values are averaged in Step S2.

Step S1A is described specifically. First, in Step S1-1-1, the conduction rate calculation unit 502 examines whether or not the power generation abnormality information on the power generator 1-1 has been received from the power generator 1-1. When the power generator 1-1 has transmitted the power generation abnormality information, the flow advances to Step S1-1-2, and otherwise the flow advances to Step S1-1. In Step S1-1-2, the conduction rate calculation unit 502 inhibits the field duty value of the power generator 1-1 from being stored in the memory, and subtracts one from the current total number of power generators 1 so as to avoid counting the power generator 1-1 in the total number of power generators when the field duty values are averaged in Step S2. Meanwhile, in Step S1-1, the conduction rate calculation unit 502 stores the field duty value of the power generator 1-1 in the memory. Those operations are performed on the "n" power generators 1 in order.

Step S3A is basically the same as Step S3A of FIG. 8, but in FIG. 10, in Step S1A described above, the power generator 1 that has output the power generation abnormality information is not a limiting target of the external control device 5 due to the fact that the field duty value is not stored in the memory as described above, and is brought to a state of having been paralleled-off to be excluded from the limiting target. As a result, the power generators other than the power generator that has been brought to a power generation abnormal state can continue a state of having the power generation amounts balanced.

In a case where the power generator is incorporated into the target of the power generation control system while the power generator remains in the power generation abnormal state, the field duty value of the power generator in the non-power generation state becomes 0%. When the information is incorporated into the averaging processing, the average value of the field duty values becomes lower, and the field duty values of the normal power generators other than the power generator in the non-power generation state are higher, which causes the external control device 5 to impose a limit on only the power generators in a normal power generation state. Therefore, there is a fear that the voltage of the vehicle storage battery 2 is lowered due to the shortage of the total power generation amount in response to the power generation request of the vehicle. In view of the foregoing, in this embodiment, the power generator that has been brought to the power generation abnormal state is paralleled-off to be excluded from the limiting target, to thereby maintain a normal state as the behaviors of the power generators other than the power generator that has become abnormal in terms of power generation.

Further, the power generation abnormal state of the power generator 1 is detected every communication cycle illustrated in FIG. 4, which is described above, and hence when the power generator 1 in the power generation abnormal state is recovered, it is possible to immediately return the recovered power generator 1 to the target of the power generation control system from the subsequent update cycle.

FIG. 10 is the illustration of an example in which Step S1A is applied to FIG. 8, but is not limited thereto, and it is naturally understood that Step S1A may also be applied to FIG. 2.

Next, a description is given of a case in which calculation processing performed by the conduction rate calculation unit 502 of the external control device 5 has become abnormal. Conceivable examples of an abnormal mode assumed when the calculation processing performed by the conduction rate calculation unit 502 of the external control device 5 has become abnormal include a case in which the field duty limiting command value is fixed at 100% and a case in which the field duty limiting command value is fixed at 0%.

When the field duty limiting command value becomes 100%, the power generation control device 4 of the power generator 1 causes the NOR circuit 407 to determine the field duty, and hence imbalance occurs among the power generation amounts of the power generators 1, but a vehicle power source system itself causes no overvoltage or other such abnormality.

Meanwhile, when the field duty limiting command value is fixed at 0%, the power generator 1 itself may be in a non-power generation state.

Figure 11:
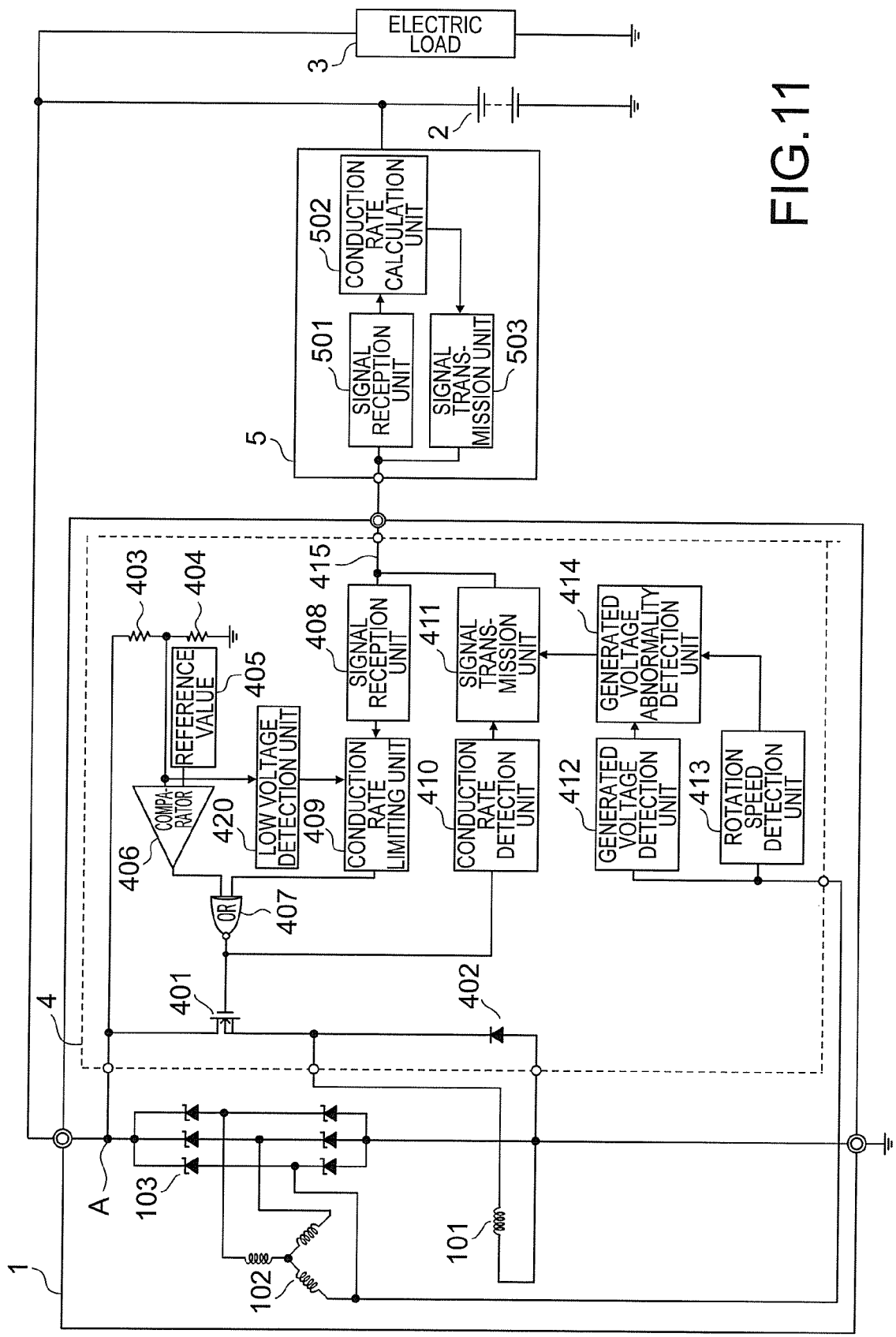
FIG. 11 is a configuration diagram for illustrating a modification example of the configuration of the power generation control system for the vehicle according to the first embodiment of the present invention.

In view of the foregoing, in this embodiment, as illustrated in, for example, FIG. 11, in order to detect that the field duty limiting command value has been fixed at 0%, a low voltage detection unit 420 may be provided. The same value as the input value to the comparator 406 is input to the low voltage detection unit 420. That is, the value obtained by dividing the output terminal voltage of the power generator 1 by the resistors 403 and 404 is input to the low voltage detection unit 420. When detecting based on the value that the output terminal A of the power generator has exhibited a voltage lower than a lower limit threshold value set in advance, the low voltage detection unit 420 outputs low voltage information for notifying the low voltage to the conduction rate limiting unit 409.

The lower limit threshold value for low voltage detection is set to a lower limit value within a voltage range in which, for example, auxiliaries involving an external control voltage are normally operable on the set vehicle power source system.

When receiving the low voltage information from the low voltage detection unit 420, the conduction rate limiting unit 409 disables the field duty limiting command value from the external control device 5 (fixes the output signal at the Low potential), and controls the field driver 401 based on only the signal from the comparator 406.

Under such control, even when the field duty limiting command value from the external control device 5 is abnormal, the vehicle power source system itself can avoid being brought to a low voltage state. As described above, the low voltage detection unit 420 forms a command abnormality detection unit configured to detect that the field duty limiting command value from the external control device 5 is abnormal.

As a recovery condition for enabling the field duty limiting command value, when the low voltage detection unit 420 no longer detects the low voltage and the field duty limiting command value becomes equal to or larger than a threshold value, the field duty limiting command value is again enabled to be returned to the power generation amount balance control.

As another conceivable example of the abnormal mode of the field duty limiting command value of the conduction rate calculation unit 502 of the external control device 5, there is a case in which the power generation control device 4 cannot receive the field duty limiting command value. In the power generation control device 4, when the signal reception unit 408 cannot receive the field duty limiting command value, the power generation control device 4 avoids causing the conduction rate limiting unit 409 to perform the limiting, and drives the field driver 401 based on the field duty determined by the comparator 406.

As described above, in this embodiment, the power generation control devices 4 of the respective power generators 1 transmit the field duties of the field coils 101 of the respective power generators 1 to the external control device 5, while the external control device 5 obtains the average value of the field duties, obtains the field duty limiting command value for limiting the field duties of the field coils 101 determined by the power generation control device 4 based on the average value, and transmits the field duty limiting command value to the power generation control device 4. Accordingly, the power generation control device 4 limits the power generation amounts of the respective power generators 1 based on the field duty limiting command value, to thereby be able to equalize the power generation amounts of the respective power generators 1.

Further, in this embodiment, the conduction rate calculation unit 502 of the external control device 5 sets the power generator 1 having the minimum field duty as a "power generator excluded from the limiting target" based on the field duties of the field coils 101 of the respective power generators 1 received by the signal reception unit 501, sets the power generator 1 other than the "power generator excluded from the limiting target" as a "power generator of the limiting target", and transmits the field duty limiting command value to only the power generation control device 4 connected to the "power generator of the limiting target" via the signal transmission unit 503. In this manner, in this embodiment, no limits are set for the power generator having a minimum field duty, and hence even when there is an abrupt increase in the electric load amount of the vehicle, the power generator having a minimum field duty can handle the increase in the power generation amount, which can avoid the voltage drop of the vehicle storage battery 2.

REFERENCE SIGNS LIST

1 power generator, 2 vehicle storage battery, 3 vehicle electric load, 4 power generation control device, 5 external control device, 101 field coil, 102 stator coil, 103 rectifier, 401 field driver, 402 reflux diode, 403, 404 resistor, 405 reference value, 406 comparator, 407 NOR circuit, 408 signal reception unit, 409 conduction rate limiting unit, 410 conduction rate detection unit, 411 signal transmission unit, 412 generated voltage detection unit, 413 rotation speed detection unit, 414 power generation abnormality detection unit, 415 communication unit, 420 low voltage detection unit, 501 signal reception unit, 502 conduction rate calculation unit, 503 signal transmission unit.

The invention claimed is:

1. A power generation control system, which is configured to simultaneously drive, by an internal combustion engine, a plurality of power generators mounted to the internal combustion engine, the power generation control system comprising:
   a power generation control device to control each of the plurality of power generators; and
   an external control device connected to the power generation control device,
   wherein the power generation control device includes:
       a field driver to control supplying of a field current to a field coil provided to each of the plurality of power generators;
       a voltage controller to determine a conduction rate of the field coil based on an output voltage of each of the plurality of power generators, to control the field driver, to thereby adjust the generated voltage of each of the plurality of power generators at a target voltage value;
       a conduction rate detector to detect the conduction rate of the field coil of each of the plurality of power generators;
       a first signal transmitter to transmit the conduction rate detected by the conduction rate detector to the external control device;
       a first signal receiver to receive a command value for limiting the conduction rate of the voltage controller from the external control device; and
       a conduction rate limiter to impose a limit on the conduction rate so as to set the conduction rate determined by the voltage controller to become equal to or smaller than the command value based on the command value received by the first signal receiver,
   wherein the external control device includes:
       a second signal receiver to receive the conduction rates of the field coils of each of the plurality of power generators, wherein each of the conduction rates has been detected by the conduction rate detector, from the power generation control device;
       a conduction rate calculator to obtain an average value of the conduction rates of the field coils of each of the plurality of power generators, wherein the conduction rates have been received by the second signal receiver, to set the command value based on the average value; and
       a second signal transmitter to transmit the command value set by the conduction rate calculator to the power generation control device, and
   wherein the conduction rate calculator of the external control device is configured to set a power generator having a minimum conduction rate among the plurality of power generators as a power generator excluded from a limiting target based on the conduction rates of the field coils of each of the plurality of power generators, wherein the conduction rates have been received by the second signal receiver, set a power generator other than the power generator excluded from the limiting target among the plurality of power generators as a power generator of the limiting target, and transmit the command value to the power generation control device connected to the power generator of the limiting target via the second signal transmitter.

2. The power generation control system according to claim 1, wherein the conduction rate calculator of the external control device is configured to set the command value to the same value as the average value.

3. The power generation control system according to claim 1, wherein the conduction rate calculator of the external control device is configured to set the command value to a value obtained by adding a predetermined addition value to the average value.

4. The power generation control system according to claim 1,
   wherein the power generation control device further includes a power generation abnormality detector to determine whether or not each of the plurality of power generators is in a power generation abnormal state based on at least any one of a phase voltage or a frequency of a stator coil provided to each of the plurality of power generators, and when there is a power generator in the power generation abnormal state, output power generation abnormality information for notifying the power generation abnormal state of the power generator, and
   wherein the external control device is configured to perform, when receiving the power generation abnormality information from the power generation abnormality detector via the first signal transmitter, calculation of the average value by excluding the conduction rate of the power generator corresponding to the power generation abnormality information when causing the conduction rate calculator to calculate the average value of the conduction rates, and exclude the power generator corresponding to the power generation abnormality information from the power generator of the limiting target.

5. The power generation control system according to claim 1, wherein the power generation control device is configured to avoid, when the command value is not received from the external control device, causing the conduction rate limiter to limit the conduction rate, and control the field driver based on the conduction rate determined by the voltage controller.

6. The power generation control system according to claim 1, wherein the power generation control device further includes a command abnormality detector to detect that the command value from the external control device is abnormal, and
   wherein the command abnormality detector is configured to control, when detecting an abnormality in the command value from the external control device, the field driver based on the conduction rate determined by the voltage controller without causing the conduction rate limiter to limit the conduction rate.

7. An external control device, which is configured to be connected to a power generation control device configured to control a power generator,
   the power generator being one of a plurality of power generators being mounted to an internal combustion engine and being simultaneously driven by the internal combustion engine,
   the external control device comprising:

a signal receiver to receive conduction rates of field coils of each of the plurality of power generators from the power generation control device;

a conduction rate calculator to obtain an average value of the conduction rates of the field coils of each of the plurality of power generators, to set a command value for limiting the conduction rate of the field coil determined by the power generation control device based on the average value; and a signal transmitter to transmit the command value obtained by the conduction rate calculator to the power generation control device, wherein the conduction rate calculator is configured to set a power generator having a minimum conduction rate, among the plurality of power generators, as a power generator excluded from a limiting target based on the conduction rates of the field coils of each of the plurality of power generators, set a power generator other than the power generator excluded from the limiting target, among a plurality of power generators, as a power generator of the limiting target, and transmit the command value to the power generation control device connected to the power generator of the limiting target via the signal transmitter.

* * * * *